KUSCHKE & MERKEL.
Corn-Planter.
No. 17,380. Patented May 26, 1857.
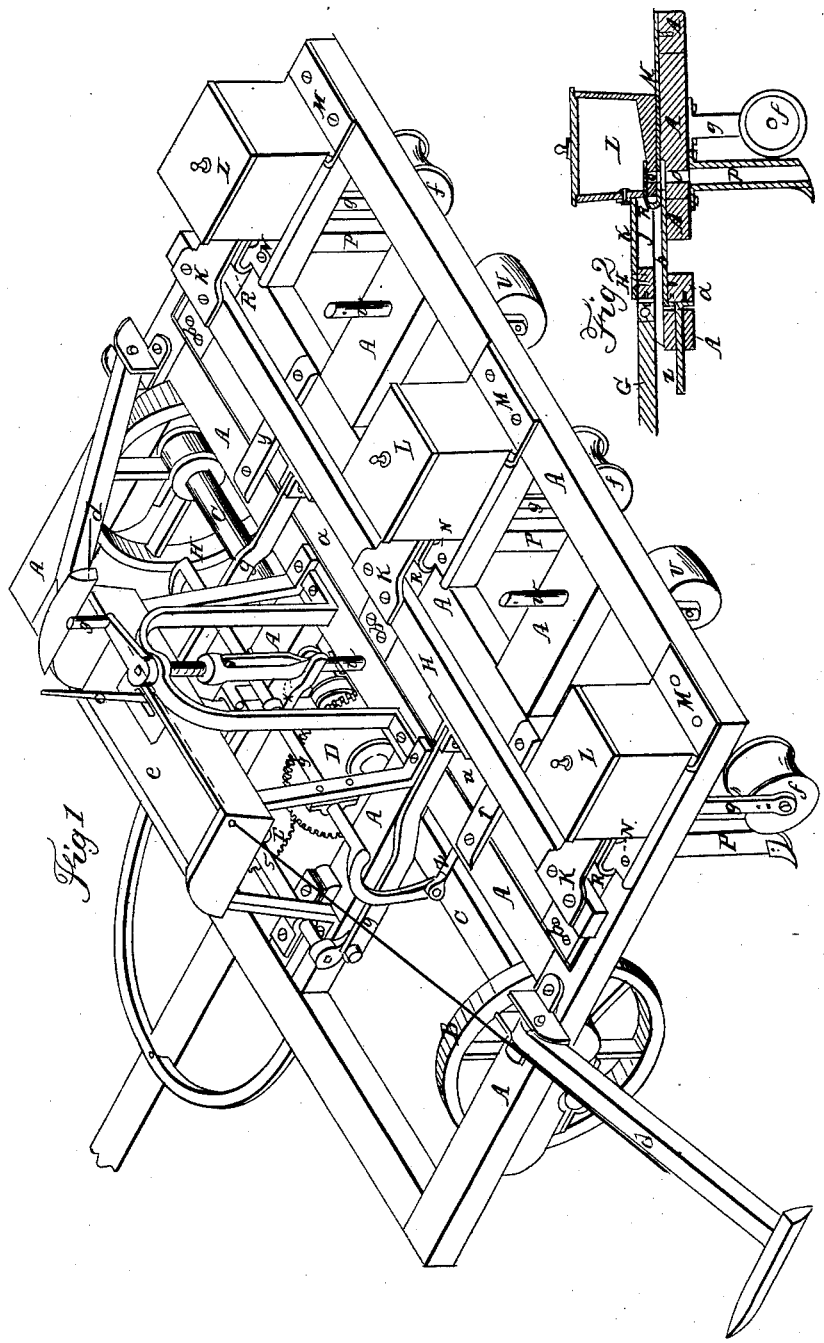

UNITED STATES PATENT OFFICE.

ROBERT KUSCHKE AND P. MERKEL, OF ST. LOUIS, MISSOURI.

IMPROVEMENT IN CORN-PLANTERS.

Specification forming part of Letters Patent No. 17,380, dated May 26, 1857.

*To all whom it may concern:*

Be it known that we, ROBERT KUSCHKE and PETER MERKEL, all of St. Louis, in the county of St. Louis and State of Missouri, have invented a new and useful Machine for Planting Corn; and we do hereby declare that the following is a full and exact description thereof, reference being had to the accompanying drawing, and to the letters of reference marked thereon.

The nature of our invention consists in a new method of planting corn by means of movable boxes, which, by passing on a frame to and fro, drop the necessary number of corns at every four feet through a hole in the bottom and through a corresponding hollow planter into the ground.

To enable others skilled in the art to make and use our invention, we will proceed to describe its construction and operation.

The base of our machine is a wooden frame, A A, in the annexed drawings, similar to those already known, and resting upon a pair of wheels, B B, connected by a shaft, C, with a crown-wheel, D, in the middle. Said crown-wheel works into another crown-wheel, E, of a smaller diameter, which is then, by means of its shaft F and arm G, connected with, and while in operation moving to and fro, the plank H, which is sliding upon the strips T T, and to which there are attached by means of the iron plates K K K the corn-boxes L L L. These corn-boxes rest and slide upon iron plates M M M, fastened upon the frame, and with a hole, N, in each one passing through the frame at O, Figure II, and corresponding with the hollow planter P. The corn-boxes have also a hole, Q, Fig. II, in the bottom, which passes, when the box is moved forward, over and corresponds with the hole in the plate, frame, and planter below, and empties also its contents into the ground, as it is seen in Fig. II, while the plate M has a bend at R, which passes at the same time, by a small slit, through the box and covers the hole O on the top, so that not more corn can pass through than is necessary, and when the box is moved backward the hole in the same will of course be opened on the top and closed below by the plate M, and also again filled with corn.

This machine is so arranged that by the difference of the diameter of the crown-wheels the corn is planted at every four feet. In order to raise the planters P P out of the ground when arrived at the end of the field and before turning the machine around, and to close the holes N N to prevent the corn from falling through while turning around, an elevating-screw, S, has been attached to the frame. This screw, by turning the handle T, raises the shaft U, which passes through the frame, and is under the same connected by an iron forked lever with the wheels V V, and by raising the shaft U the said wheels V V must of course be lowered by passing their shaft W down the frame, and consequently the frame itself, including the planters P P, must be raised out of the ground. At the same time the shaft U raises the fork X, which, connected by the shaft Y with the iron Z, pushes the same through a hole in the frame. Said iron bar Z, passing through the frame, is at the other end connected with the plank $a\, a$, to which the iron plates $b\, b$ are fastened. These plates are then consequently pushed under the iron plates M M, upon which the corn-boxes slide to and fro, and close the holes Q Q. Moreover, the whole machine can be stopped by detaching the crown-wheel D from the shaft C in the usual manner by pulling the handle $c$ to the left. In order to mark the track upon which the wheel has to be brought after turning the machine around at the end of the field, two markers, $d\, d$, one on each side, have been attached to the frame. These markers may alternately be let down or raised to the seat $e$ by ropes or strings. The covering-wheels $f\, f$ can be raised or lowered, as the case may require, the corn to be laid more or less deep into the ground by different holes in the iron fork $g\, g$, in which the wheels are inclosed.

What we claim as our invention, and desire to secure by Letters Patent, is—

The reciprocating seed-boxes L, arranged and operated in the manner and for the purpose set forth.

ROBERT KUSCHKE.
P. MERKEL.

Witnesses:
CHARLES SMITH,
THOMAS MCEVINEY.